(12) United States Patent
Burton

(10) Patent No.: US 11,300,385 B2
(45) Date of Patent: Apr. 12, 2022

(54) CAMOUFLAGE PATTERNS, ARRANGEMENTS AND OBJECTS UTILIZING THE SAME

(71) Applicant: Zachary Burton, Morrow, OH (US)

(72) Inventor: Zachary Burton, Morrow, OH (US)

(*) Notice: Subject to any disclaimer, the term of this patent is extended or adjusted under 35 U.S.C. 154(b) by 0 days.

(21) Appl. No.: 16/746,384

(22) Filed: Jan. 17, 2020

(65) Prior Publication Data

US 2021/0080228 A1 Mar. 18, 2021

Related U.S. Application Data

(60) Provisional application No. 62/794,119, filed on Jan. 18, 2019.

(51) Int. Cl.
*G06T 3/00* (2006.01)
*F41H 3/02* (2006.01)
*F41H 3/00* (2006.01)

(52) U.S. Cl.
CPC .............. *F41H 3/02* (2013.01); *F41H 3/00* (2013.01); *G06T 3/0018* (2013.01)

(58) Field of Classification Search
CPC .... G06T 3/0018; D03D 1/004; D03D 1/0047; F24F 1/58; F41B 5/1496; F41H 3/00; B32B 2459/00; B32B 2571/02; B63G 8/34; B63G 13/02; B64D 45/00
See application file for complete search history.

(56) References Cited

U.S. PATENT DOCUMENTS

| | | | |
|---|---|---|---|
| 6,805,957 B1 | 10/2004 | Santos et al. | |
| 7,132,635 B2* | 11/2006 | Dowling | B63G 13/02 |
| | | | 250/205 |
| D592,861 S * | 5/2009 | Crye | D5/62 |
| 8,368,762 B1* | 2/2013 | Chen | H04N 17/002 |
| | | | 348/188 |
| 8,420,206 B2* | 4/2013 | Bernegger | D06P 1/004 |
| | | | 428/195.1 |
| 9,062,938 B1 | 6/2015 | McIntosh et al. | |
| 9,208,398 B2 | 12/2015 | Rosswog et al. | |
| 9,869,104 B2 | 1/2018 | Capps | |
| 10,089,753 B1* | 10/2018 | Fegyver | G06K 9/468 |
| 10,197,362 B1 | 2/2019 | McIntosh et al. | |
| 10,430,979 B2 | 10/2019 | Turner | |
| 2016/0379335 A1* | 12/2016 | Kwon | G06T 1/20 |
| | | | 345/506 |
| 2018/0094905 A1 | 4/2018 | Cincotti et al. | |
| 2018/0126903 A1* | 5/2018 | Herrmann | H04N 5/23238 |

* cited by examiner

*Primary Examiner* — Shefali D Goradia
(74) *Attorney, Agent, or Firm* — Jenei LLC

(57) ABSTRACT

The present invention relates to camouflage pattern printed fabrics and coatings for objects such as clothing, surfaces, buildings, ground vehicles, aircraft and watercraft and superstructures, wherein the patterns are created to mimic a view from underwater towards the surface so that the camouflage pattern matches what an aquatic animal would see from underwater.

7 Claims, 6 Drawing Sheets

CAMOUFLAGE PATTERNS, ARRANGEMENTS AND OBJECTS UTILIZING THE SAME

CROSS-REFERENCE TO RELATED APPLICATIONS

The present application for patent claims priority to U.S. Provisional Application No. 62/794,119, entitled "CAMOUFLAGE PATTERNS, ARRANGEMENTS AND OBJECTS UTILIZING THE SAME," filed Jan. 18, 2019, and hereby expressly incorporated by reference herein.

BACKGROUND OF THE INVENTION

1. Field of the Invention

The present invention relates to camouflage pattern printed fabrics and coatings for objects such as clothing, surfaces, buildings, ground vehicles, aircraft and watercraft and superstructures, wherein the patterns are created to mimic a view from underwater towards the surface so that the camouflage pattern matches what an aquatic animal would see from underwater.

2. Description of the Related Art

The present invention relates to a camouflage object such as clothing, surfaces, buildings, ground vehicles, aircraft and watercraft and superstructures thereof. More specifically, the invention relates to a camouflage pattern comprising fish eye camouflage that keeps fish and aquatic animals from sensing the fisher or sportsperson.

Various camouflage patterns have been known. The document U.S. Pat. No. 6,805,957 describes a disruptive camouflage pattern system to be used for both military and civilian applications. The system includes specialized techniques for printing the camouflage pattern system onto the fabric. The system provides camouflage in both the human visible light and the near infrared range. The system depends on a macro pattern resulting from a repeat of a micro pattern. The coloring used includes at least four colorings from dyes that in combination produce a percent reflectance value comparable to that of the negative space surrounding the camouflaged subject. The system functions by way of a macro pattern being disruptive of the subject's shape and a micro pattern having sharp-edged units of a size capable of blending into the subject's background.

It is important for fishers, hunters and other sports enthusiasts to remain camouflaged while engaged in sports. Hunters and fishers often wear various camouflaged garments, such as jackets, hats, and pants, among others. However, conventional camouflage includes only a specific pattern and coloration tailored to a single environment and may not help the hunter to blend in with their current environment. Conventional camouflaged garments do not include natural elements of aquatic environments, such as the viewpoint of the fish and other aquatic animals, and thus do not allow the fishers and hunter to completely blend in with his or her surroundings.

Printed camouflage pattern fabrics and coatings have been used in the hunting applications and environments for both clothing and equipment. The camouflage pattern is designed to conceal people, their clothing and equipment by allowing them to blend into the background environment.

Such camouflage patterns, in the hunting environment, are typically used to blend into a natural environment and are composed of leaves, trees and other vegetation with colors based on the foliage of the area in which the equipment is being used.

Printed camouflage patterns of the camouflage pattern may only match a particular type of land foliage at one particular time of day in one particular season. Printed camouflage patterns do not allow for changes in the colors and characteristics of the foliage in the pattern to match what an aquatic animal sees from underneath the water.

The present invention, by creating a printed camouflage pattern that mimics changes in the colors and characteristics of the foliage in the pattern to match what an aquatic animal sees from underneath the water that is then applied to fabric or coatings, allows colors and patterns to match what an aquatic animal would see from underwater.

The present invention, by its unique methods and systems involving creating underwater view patters that are applied to fabric or equipment, creates specific camouflage patters and therefore creates aquatic-specific camouflage pattern for fishing and other sports.

In light of the devices disclosed in the known art, it is submitted that the present invention substantially diverges in design elements from the devices in the known art and consequently it is clear that there is a need in the art for an improvement to existing camouflage garments devices. In this regard, the instant invention substantially fulfills these needs.

SUMMARY OF THE INVENTION

It is an object of the presently disclosed subject matter to provide photographic camouflage patterns, arrangements and methods for making the same.

In one aspect, the present disclosure provides a systems and methods of camouflage directed to aquatic sports.

In another aspect, the present disclosure provides a system that includes a camouflage scheme for camouflage patterns for objects to be camouflaged that is flexible in use for different sizes of objects to be camouflaged. Camouflage should be possible for any random object such as in particular clothing, surfaces, ground vehicles and air- and watercraft. In particular, at least some of the drawbacks described above should be avoided and thus substantially better camouflage be enabled.

In particular, the camouflage system of the present invention provides a camouflage to accommodate aquatic environments to allow a person or object to blend in with what an aquatic fish or other animal naturally sees in their habitat and environment. Patterns in use thus far are not or insufficiently matched to natural conditions in the features of the object's background when viewed from the perspective of the aquatic life.

In one or more embodiments, the invention provides for camouflage pattern printed fabrics and coatings for objects such as clothing, surfaces, buildings, ground vehicles, aircraft and watercraft and superstructures, wherein the patterns are created to mimic a view from underwater towards the surface so that the camouflage pattern matches what an aquatic animal would see from underwater. The pattern matches the fishing and aquatic environment allowing a person and the person's clothing and equipment to blend into the background.

In one or more embodiments, the invention provides for camouflage pattern printed fabrics and by creating a printed camouflage pattern that mimics changes in the colors and characteristics of the foliage in the pattern to match what an aquatic animal sees from underneath the water that is then applied to fabric or coatings, which allows colors and patterns to match what an aquatic animal would see from underwater. A variety of patterns may be used with the present invention.

The creation and utilization of photographic camouflage patterns or arrangements to create visual confusion can be used to disguise the recognizable form of the camouflaged objects by breaking up the objects' outline through the use of unnatural magnifications and distortions of the photo-image. In one embodiment, the present invention provides for methods for constructing the camouflage arrangements can comprise procuring site-specific photographic images and manipulating the site-specific photographic images to produce site-specific camouflage, thereby providing increased concealment to an object. In one particular embodiment, the camouflage arrangement can be transferred to a substrate that can then be wrapped around or applied to a physical item, such as a vehicle or other transportation means as well as a structure, building, weapon or other equipment.

In one aspect, a site-specific photographic image can be manipulated by adding one or more disruptive patterns thereon to achieve a disruptive effect that aids in the cause of visual confusion by inhibiting normal depth perception. These processes can disrupt the normal environment of the site-specific photographic images to disrupt vision rather than attempting to create a camouflage pattern or arrangement to match the photographic image.

The present invention, by its unique methods and systems involving creating underwater view patters that are applied to fabric or equipment, creates specific camouflage patters and therefore creates aquatic-specific camouflage pattern for fishing and other sports.

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

Figure 1:
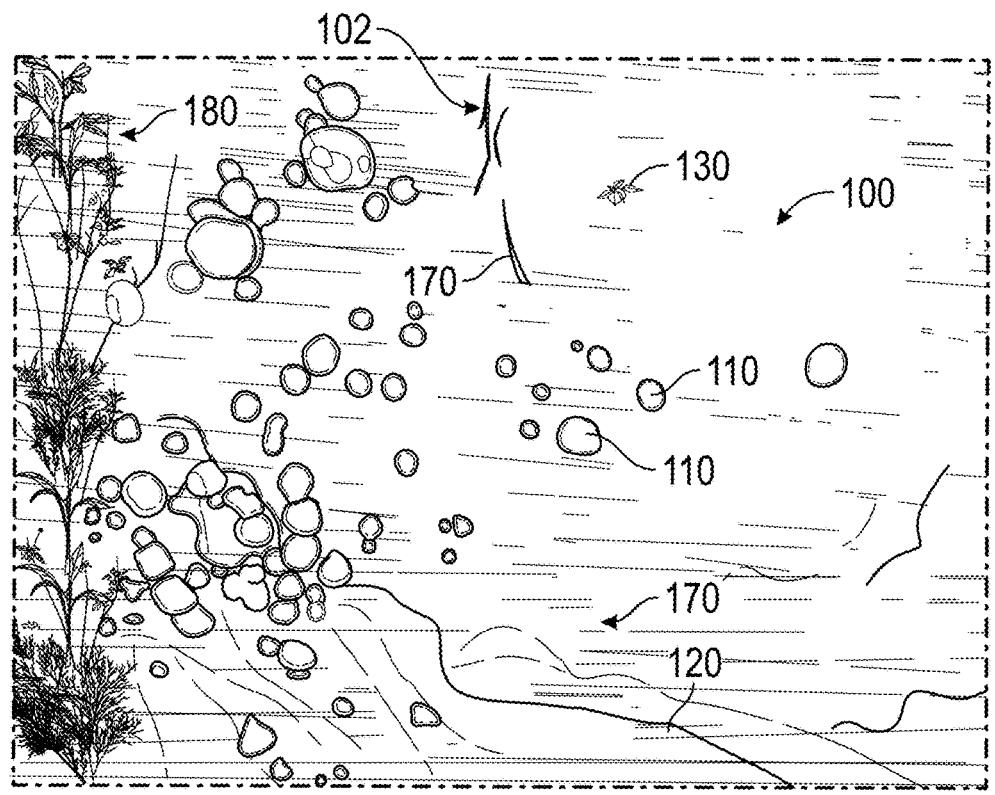
FIG. 1 illustrates one embodiment of a fish eye camouflage pattern incorporating aspects of the disclosed embodiments, in grayscale, wherein the perspective is from underwater and includes the view above the waterline.

Reference is made herein to the attached drawings. Like reference numerals are used throughout the drawings to depict like or similar elements of the camouflage garment. For the purposes of presenting a brief and clear description of the present invention, the preferred embodiment will be discussed as used for fishing and other aquatic sports activities. The figures are intended for representative purposes only and should not be considered to be limiting in any respect.

Printed camouflage applied to fabric and printed camouflage fabric for fishing and aquatic sports can readily be obtained in the market from any one of a number of suppliers. Printed camouflage patterns can be applied to fabric for sporting and activity clothing and equipment to disguise the users by blending into the foliage. Printed camouflage layers are normally in a pattern and colors representing the typical background of an activity in question.

Camouflage patterns are typically unique to the sports equipment supplier and matches the known external environments. Camouflage patterns are typically composed of foliage such as trunks, leaves, other parts of trees or other plants with a color pattern which matches the known environment. Such printed camouflage layers and printed camouflage fabric do not, however, conform to the view directed form an underwater perspective to the out-of-water perspective.

The present innovation relates generally to methods and materials for creating site-specific photographic camouflage arrangements and methods for making the same. The photographic camouflage arrangements include a digital photographic image and distorting disruptive patterns placed on the digital photographic image to create visual confusion to disguise the recognizable form of a camouflaged object by breaking up its outline.

In one or more embodiments, the invention provides for camouflage pattern printed fabrics and coatings for objects such as clothing, surfaces, buildings, ground vehicles, aircraft and watercraft and superstructures, wherein the patterns are created to mimic a view from underwater towards the surface so that the camouflage pattern matches what an aquatic animal would see from underwater. The pattern matches the fishing and aquatic environment allowing a person and the person's clothing and equipment to blend into the background.

In one or more embodiments, the invention provides for camouflage pattern printed fabrics and coatings that include elements from an underwater perspective such as:

In one aspect, the present disclosure provides a variety of camouflage patterns rendered to look as though taken from the view of a fish underwater.

In one embodiment, the present invention provides for camouflage pattern printed fabrics and coatings that include photographs or drawings as seen in various underwater habitats.

In another aspect, the present disclosure provides for camouflage pattern printed fabrics and coatings that include elements seen from an underwater perspective including aquatic plants and trees, sticks and leaves, stones, pebbles, water ripples, air bubbles, detritus and other debris floating in the water and other underwater environmental elements.

"Disruptive pattern" as used herein means a pattern of shapes that when configured on an image will cause visual confusion.

"Distortions," "distorting," and variations thereof as used herein means the changing of at least a portion of an image by manipulating portions of the image to change the appearance of the image in order to cause at least a portion of the image to appear to be a view from underwater.

"Fish-eye" as used herein means a perspective view as seen or would be seen from a fish or other aquatic animal' point of view from underwater.

"Fish-eye lens" as used herein means an optic lens capable of rendering a perspective view as seen or would be seen from a fish underwater.

"Image" as used herein means the optical counterpart of an object or environment produced by graphical drawing by a person, a device (such as a computer) or a combination thereof. The optical counterpart of the object can also be produced by an optical device electromechanical device or electronic device. As used herein, "image" can be used to refer to a whole image, for example, a photographic image as taken by a photographic device, or a portion thereof.

"Site-specific" as used herein means a specific local terrain and aquatic environment where a physical item will be located or operating, or the environmental characteristics which would be found in the intended operating environment of the physical item. In one or more embodiments, the camouflage patterns and processes can use aquatic habitats and environments from geographic locations specific to the intended use such as a specific region or season.

In one or more embodiments, the camouflage patterns and processes can use photo-digital processes to create the camouflage patterns. The variations of the processes described herein are distinguishable from any previously identified photo-digital camouflages processes in numerous ways. For example, these processes seek to disrupt the normal environment of the site-specific photographs to match the photograph or appear to be part of the environment displayed on the photograph. Also, the various camouflage patterns described herein create distinct camouflage patterns for different or multiple visual angles or perspectives of the same object in order to maximize stealth or concealment from each angle. Rather than attempting to create a camouflage pattern that is realistic or similar to what is displayed in a photograph, the camouflage patterns described herein are attempting to distort the image to thereby making the camouflage pattern more effective.

This process can begin with a photographic image of a specific local terrain, nautical position, or airspace where a physical item will be located or operating. Alternatively, the photographic image can contain environmental characteristics which would be found in the intended operating environment of the physical item instead of being a specific image from the specific location of the physical item. As stated above, the physical item can include, but is not limited to any and all types of vehicles (land, air and sea, and rail/manned & unmanned), aircraft, watercraft, structures, buildings, pipes and piping, equipment, weapons, hardware, and other items used for military or other purposes.

The methods described herein may be used for developing a camouflage pattern. The camouflage pattern can be transferred to a substrate. The substrate may include a vinyl wrapping or other adhesive material for covering physical items. Such physical items can include, but are not limited to, any and all types of vehicles (land, air and sea, and rail/manned & unmanned), aircraft, watercraft, structures, buildings, pipes and piping, equipment, weapons, hardware, and other items used for military or other purposes where camouflage can enhance its effective use or where the need for camouflage concealment or deception exists.

The camouflage patterns and processes can use photo-digital processes to create the camouflage patterns. The variations of the processes described herein are distinguishable from any previously identified photo-digital camouflages processes in numerous ways. For example, the methods of the present invention are used to change the appearance of the image in order to cause at least a portion of the image to appear to be a view from underwater. Also, the various camouflage patterns described herein create distinct camouflage patterns for different or multiple visual angles or perspectives of the same object in order to maximize stealth or concealment from each angle. Rather than attempting to create a camouflage pattern that is realistic or similar to what is displayed in a photograph, the camouflage patterns described herein are attempting to distort the image to appear as though viewed from underwater thereby making the camouflage pattern more effective in aquatic-related environments.

In one or more embodiments, the camouflage patterns and processes can use drawing or computer image processes to create the camouflage patterns.

This process can begin with a photographic image of a specific local terrain, nautical position, or airspace where a physical item will be located or operating. Alternatively, the photographic image can contain environmental characteristics which would be found in the intended operating environment of the physical item instead of being a specific image from the specific location of the physical item. As stated above, the physical item can include, but is not limited to any and all types of vehicles (land, air and sea, and rail/manned & unmanned), aircraft, watercraft, structures, buildings, pipes and piping, equipment, weapons, hardware, and other items used for military or other purposes.

The photographic image can be digital and can then be manipulated such that site-specific photographic camouflage contains image distortions to aid in inhibiting the ability to easily distinguish perception from an aquatic environment. For example, FIGS. 1-4 illustrate different camouflage patterns generally, each of which includes portions or areas of one or more photographic images that are site-specific for the intended operating environment in which the camouflage is to be used.

Referring to FIG. 1, one example of a fish eye camouflage pattern incorporating aspects of the disclosed embodiments is illustrated. The aspects of the disclosed embodiments are directed to a fish eye camouflage pattern that represents a perspective from underwater and includes the view above the waterline. The unique camouflage pattern of the present disclosure can be applied to a substrate, such as a recreational or military garment, and is configured to provide improved concealment in an aquatic environment.

While the aspects of the disclosed embodiments are generally described herein with respect to a fishing and other aquatic sports and recreational activities, the aspects of the disclosed embodiments are not so limited. Alternative applications of the camouflage pattern 100 can include, but are not limited to, helmets, helmet covers, hats, bags, back packs, netting, vehicles, aircraft, tracked vehicles including tanks, tents, portable enclosures and buildings, for example. Numerous other non-military applications for the camouflage pattern 100 of the disclosed embodiments can also be contemplated. These can include, for example, law enforcement, hunting, outdoor sports and other activities that can make use of the improved levels of concealment provided by the camouflage pattern 100 of the present disclosure.

The exemplary design of the camouflage pattern 100 illustrated in FIG. 1 generally comprises an underwater perspective view including a view of the water surface 102 from underneath as well as bubbles 110 in the water, underwater surfaces 120, detritus 130, water ripples 170 and shadows of objects from above the surface 180.

Figure 2:
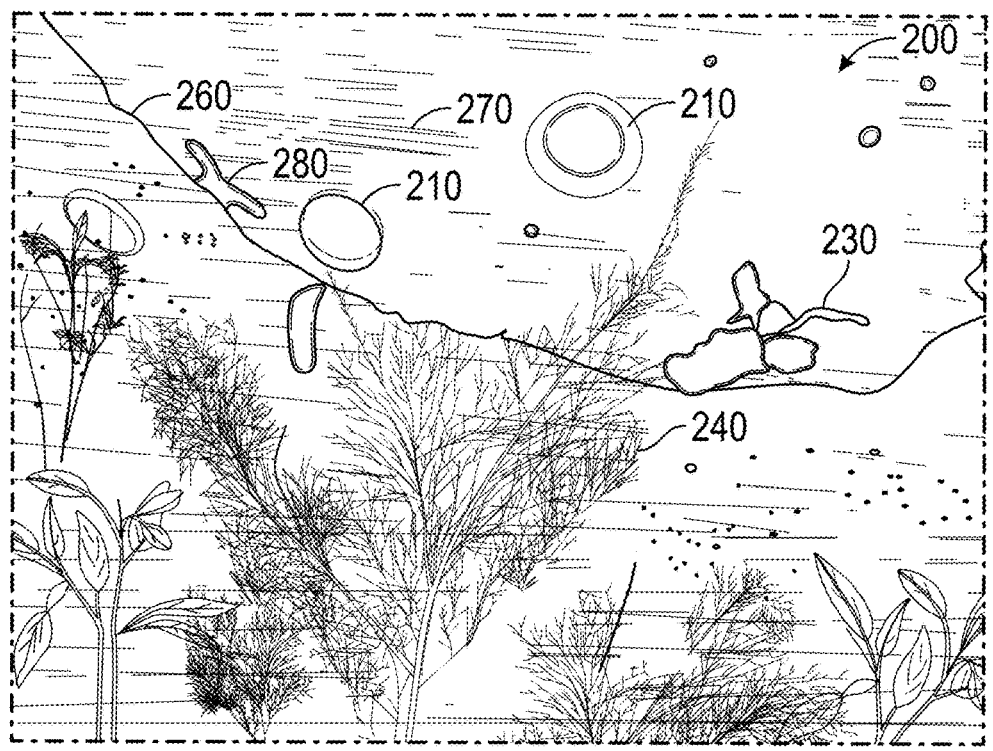
FIG. 2 illustrates one embodiment of a camouflage pattern incorporating aspects of the disclosed embodiments, in grayscale, wherein the perspective is from underwater and includes plants, bubbles and ripples.

Another exemplary camouflage pattern 200 illustrated in FIG. 2 generally comprises an underwater perspective view including a view of the water surface 202 from underneath as well as bubbles 210 in the water, underwater surfaces 220, detritus 230, underwater aquatic plants 240, water ripples 270 and shadows of objects from above the surface 280.

Another exemplary camouflage pattern 300 illustrated in FIG. 2 generally comprises an underwater perspective view including a view of bubbles 310 in the water, underwater surfaces 320, detritus 330, underwater aquatic plants 340, water ripples 370 and shadows of objects from above the surface 380.

Figure 3:
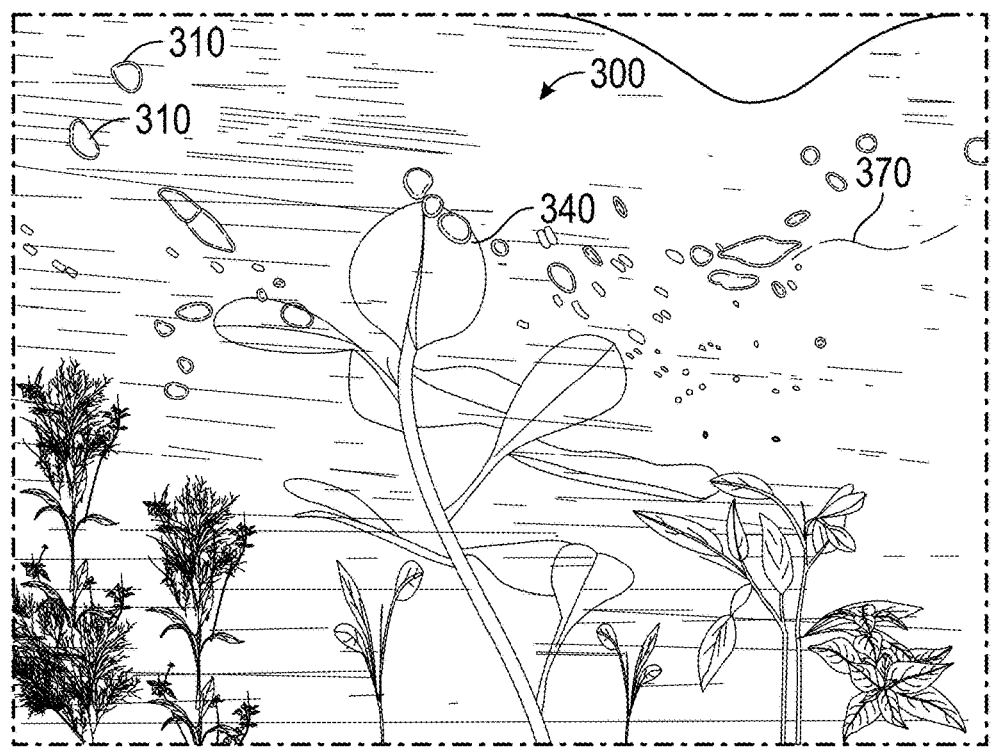
FIG. 3 illustrates another embodiment of a camouflage pattern incorporating aspects of the disclosed embodiments, in grayscale, wherein the perspective is from underwater and includes plants, bubbles and ripples.

As noted, the formation of the camouflage pattern 100, 200, 300, shown in FIGS. 1-3 is a result of the perspective from underwater. As will be described further herein, in one embodiment, the camouflage patterns 100, 200, 300 may comprise a simple black and white or greyscale image or may comprise one, two or more colors.

In one or more embodiments, the camouflage pattern is configured such that approximately 50% of the area to be camouflaged are configured in the most extreme mode possible of the background property and approximately 50% in the diametrically exactly contrary mode. For example, for a suit for verdant terrain: 50% light-50% dark, 50% brown-50% green.

In one or more embodiments, the camouflage pattern is configured such that the object to be camouflaged is treated on the basis of axes of symmetry so that the spatial arrangement must match the structure of the surroundings. That is, the image is oriented such that the camouflage pattern is as would be seen on the object to be camouflaged when is normal operational use. For example, the light sky portion is oriented towards the sky and the dark woodlands, plants, earth portion is oriented towards the grounds on the object to be camouflaged when is normal operational use.

Figure 4:
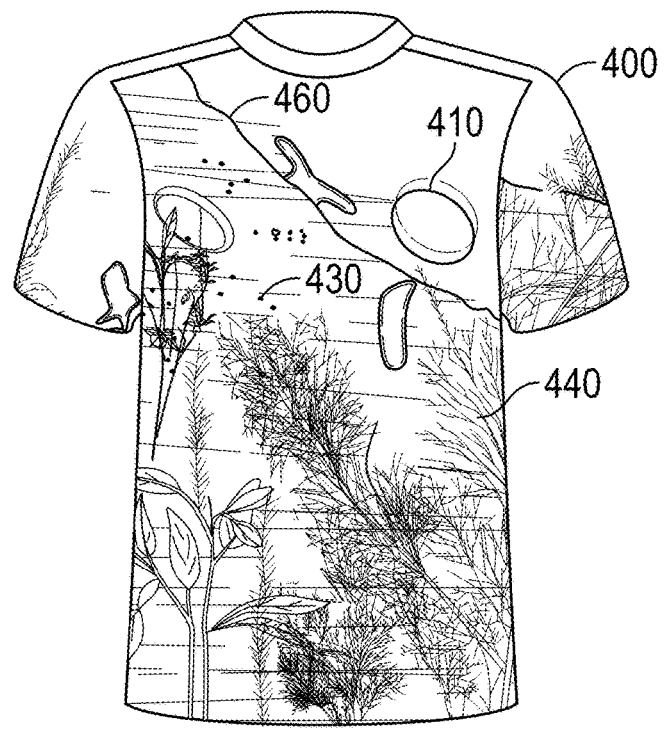
FIG. 4 illustrates a perspective view of one embodiment of an exemplary clothing article to which the camouflage pattern of the present disclosure can be applied.
Figure 5:
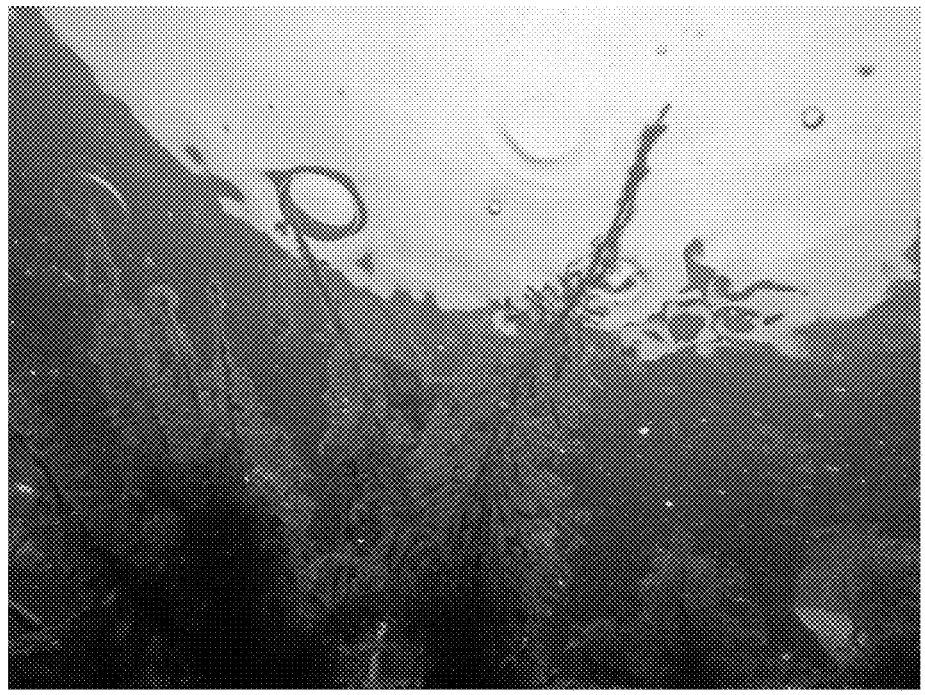
FIG. 5-11 illustrate various embodiments of a camouflage pattern incorporating aspects of the disclosed embodiments.
Figure 6:
Figure 7:
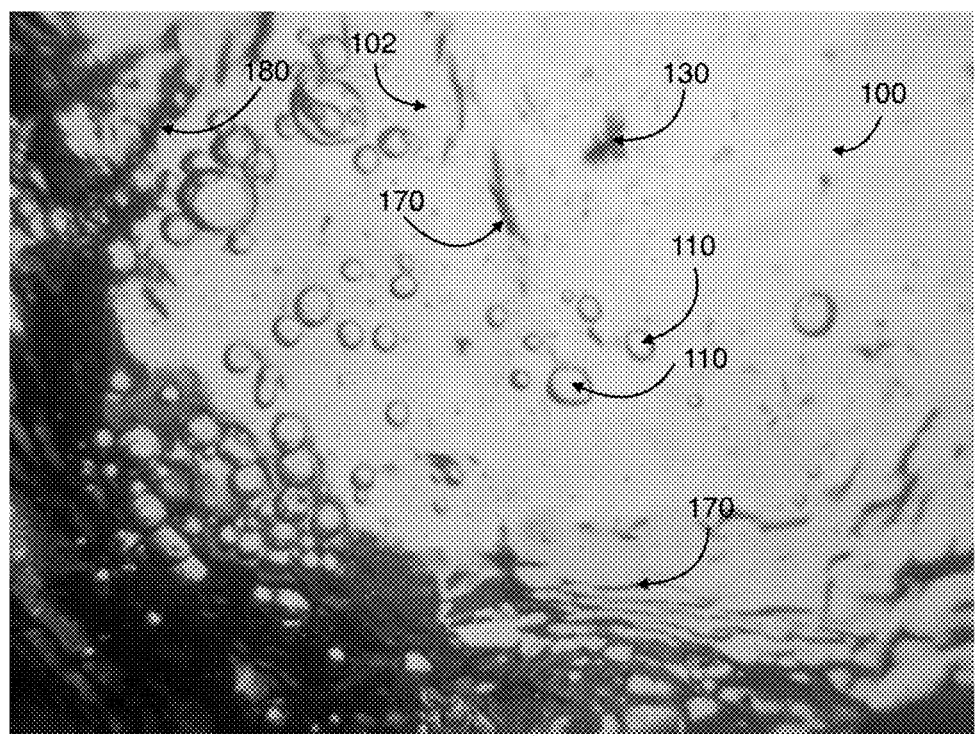
Figure 8:
Figure 9:
Figure 10:
Figure 11:

FIG. 4 illustrates the application of the camouflage pattern 200 of the disclosed embodiments to a surface of an article of clothing 400, as depicted as a shirt, showing the camouflage pattern 200 wrapped around the article of clothing 400. The article of clothing 400 includes a fabric material on which the camouflage pattern 200 is applied, such as by printing in color or black and white. The fabric material of the article of clothing 400 in this example can include any fiber blend used to construct textiles for clothing and individual equipment. The camouflage pattern 200 printed on the surface of article of clothing 400 depicts an underwater perspective view including a view of bubbles 410 in the water, detritus 430, underwater aquatic plants 440, and underwater surfaces 460.

FIGS. 5-11 illustrate various embodiments of a camouflage pattern incorporating aspects of the disclosed embodiments.

In another embodiment, the angles of view from underwater can include an underwater view taken with a fish eye camera lens in order to mimic the view by a fish or other aquatic animal that is looking substantially through a body of water towards a subject or object to be camouflaged.

In one or more embodiments, the subject or object to be camouflaged is partially or wholly submerged in the body of water. In one or more embodiments, the subject or object to be camouflaged is partially or wholly above the surface of the body of water.

Such patterns and distortions can aid in camouflaging objects that are partially or wholly above the surface of the water.

The areas can have different angles of view from underwater such as an underwater view taken at a substantially horizontal angle to mimic a fish or other aquatic animal that is looking substantially straight ahead through the water. Such patterns and distortions can aid in camouflaging objects that are partially or wholly underwater.

In another embodiment, the angles of view from underwater can include an underwater view taken at a substantially vertical angle to mimic a fish or other aquatic animal that is looking substantially through the water towards the surface of the water. Such patterns and distortions can aid in camouflaging objects that are partially or wholly above the surface of the water.

In another embodiment, the angles of view from underwater can include one or more additional distortion features that could be present in an underwater view taken at a angle to mimic a fish or other aquatic animal that is looking through the water towards including underwater floating waste and debris, turbid or muddy water, low light and other low visibility environmental factors, trees and other aquatic plant life, waves and wind-blown water, rain, rain drops, water bubbles, gas bubbles and other aquatic distortions.

In another embodiment, micropatterns can be added to further distort the image. The disruptive patterns can be any shape from a structured shape to a generally amorphous shape as can be created by a pixel matrix.

Further, the camouflage can have disruptive patterns having areas with an improper focal length that creates a blurred distortion that appears to be out of visual focus. For example, specific area of the areas of one or more photographic images can include portions of images that have an improper focal length and are slightly out of focus. Such disruptive patterns with blurred distortions can create further visual confusion for an observer and/or for an electronic or optical device. For example, for a physical item that contains images having multiple focal lengths and/or image portions having improper focal lengths that creates an out of focus portion beside an image portion that has a proper focal length and is in focus, an optical or electronic device that detects such a physical item will have difficulty focusing on the physical item and/or determining a correct distance between the device and the physical item.

Placement of unnaturally occurring colored disruptive patterns and micro patterns on the original site-specific photographic image disrupts the contour of the camouflaged object and breaks up the visual pattern and distinguishable shape of the object.

In one or more embodiments, the subject or object to be camouflaged is created by a process including the steps as:
Step 1 Select an image taken from nature proximate to a body of water of interest;
Step 2 Distort the selected image to impart a fish-eye effect to provide for a perspective view as seen or would be seen from a fish or other aquatic animal' point of view from underwater.
Step 3 Optionally, shift the hue/select colors or distort the image as necessary to approximate the geographical location of interest;
Step 4 Optionally, add a disruptive pattern of contrasting elongate shapes to obscure identification of a person; and
Step 5 Apply to a fabric or object to be camouflaged.

In one or more embodiments, the subject or object to be camouflaged is created by a process including the steps as:
Step 1 Select an image taken from nature wherein the image is taken from underwater in a body of water of interest;

Step 3 Optionally, shift the hue/select colors or distort the image as necessary to approximate the geographical location of interest;

Step 3 Optionally, add a disruptive pattern of contrasting elongate shapes to obscure identification of a person; and Step 4 Apply to a fabric or object to be camouflaged.

Referring to FIGS. 1-11, a process for creating a camouflage from a digital photographic image using fish eye lens distortive patterns is described in detail. First, a digital photographic image is procured or obtained that can be used in an intended operating environment. For example, suitable high megapixel digital still photographs of the specific terrain, nautical position, or airspace which the user will be operating can be acquired. These digital still photographs can be obtained in different manners and using different equipment. For example, the digital still photographs can be obtained through digital still cameras, high definition and standard definition video cameras, or satellite imagery.

Once obtained, the digital photographic image in the form of a high megapixel digital still photograph, for example, is the starting point for the camouflage, concealment or deception pattern to be created and later applied to a physical item such as a military vehicle (land, air or sea), structure, weapon, hardware, fabric, netting, mesh, or equipment.

A suitable digital photographic image or images can contain a very precise match to the specific operating environment by being high megapixel photo duplicates of the environment. Alternatively, a suitable digital photographic image or images can contain environmental characteristics which would be found in the intended operating environment of the physical item The photographs can be from different viewing perspectives to allow the capability to design appropriate camouflage that will be effective from different viewing perspectives (when viewed from above, on any side, or when necessary viewed from below).

For example, as illustrated in FIG. 4, if the physical item to be camouflaged is to reside or operate within an aquatic environment, the digital photographic image can reflect the general characteristics of an aquatic environment or can be from the actual aquatic location in which the camouflaged physical item will reside and/or operate.

The digital photographic image is opened on the computer in an image-editing program so that the digital photographic image can be distorted using a fish-eye style lens distortion to create a camouflage pattern for concealment or deception purposes in an aquatic environment. The image-editing program can be, for example, PHOTOSHOP® offered by Adobe Systems Incorporated, San Jose Calif. Other image-editing programs can include equivalent photo manipulation and editing software programs such as PAINT and PICASA, or the like, or in the case of video footage the image-editing programs can include appropriate video editing software programs that will produce a digital still frame photographic image.

Next, the digital photographic image can be manipulated by adding "disruptive patterns" to break-up or hide the contour of the physical item to be camouflaged or concealed as an aid in causing visual confusion. The disruptive pattern can contain any shapes, elements or objects normally associated with an aquatic environment including underwater floating waste and debris, turbid or muddy water, low light and other low visibility environmental factors, trees and other aquatic plant life, waves and wind-blown water, rain, rain drops, water bubbles, gas bubbles and other aquatic distortions.

The shapes, elements or objects of the disruptive pattern can be of a size that is relative to the scale and size of the digital photographic image so as to not overwhelm the digital photographic image. In a similar manner, the proximity, or distance, between the shapes of the disruptive pattern, can be close enough so as to facilitate the creation of visual confusion when positioned on the digital photographic image but far enough apart from each other to not overwhelm the digital photographic image. For this reason, the size and shape of the shapes can affect the number of shapes within a given disruptive pattern.

The shapes of the disruptive pattern can be colored to create colored shapes. The one or more colors can be selected from a range of colors suitable for the intended operating environment in which the camouflage is to be used. For example, the one or more colors can be selected from a range of colors from the digital photographic image and/or the operating environment in which the camouflage is intended to be used. More than one color can be used to color the different shapes. For example, some of the shapes can be one color and other shapes can be another color.

In one or more embodiments, additional micropatterns can be added to increase the visual confusion. The additional micropatterns are smaller patterns than the disruptive patterns and can be a generally amorphous shape. The micropatterns can include one or more additional colors not used in the disruptive pattern from the range of colors from the digital photographic image and/or the operating environment in which the camouflage is intended to be used. The image-editing program can include computer assisted photo illustration software tools to add these micropatterns to the suitably chosen digital photographic image. The micropatterns can be randomly dispersed over the area of the field of the digital photographic image in the camouflage pattern such that the micropatterns, when added to together with disruptive pattern, should not create patterns so dense as to overwhelm the digital photographic image of the camouflage pattern.

Once a suitable digital photographic image of the operational environment has been acquired, and it is enhanced to improve its camouflage effect, digital copies of the created photographic camouflage pattern can be saved at varying sizes for different sized applications on the computer or a memory device.

The appropriate size of the previously saved photographic camouflage pattern that best corresponds with the size of the physical item to be camouflaged can be chosen and applied to the object.

In one embodiment, a camouflage pattern can be created by taking a base digital photographic image and creating disruptive patterns of distortions through the use of fish-eye lens manipulation of portions of the digital photographic image.

Some or all of these techniques and enhancements used in the camouflage embodiments described above can be used together or separately according to the desired effect or effects. The description provided below can be used with any of the camouflage embodiments described above, unless stated otherwise.

In one embodiment, the image of the camouflage can be divided into sections called panels. After printing, these panels will fit together overlapping one another when placed on the physical item. The overlapping of the panels improves seal, adhesion, and installation procedures. The sizes of the panels can depend on the size of the physical item to be camouflaged and are only constrained by the cost effectiveness of the selected size, manageability of the installation process, and the printer capabilities. For example, the panels can range from a few square inches to lengths and widths of 100 inches or more. The camouflage pattern can be printed on a substrate. The substrate can be a thermoplastic film, a mesh, a nonwoven, knitted or woven fabric, netting, or the like. The substrate used can depend on the end use of the camouflage material and the operating environment.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A method of applying an aquatic environment camouflage pattern to a physical article, the method comprising:
    obtaining a photographic image having environmental characteristics which is found in an intended operating environment of the physical article;
    wherein the photographic image is obtained using a fisheye camera lens that distorts the photographic image by applying a fish-eye disruptive pattern to the photographic image to change an appearance of the image in order to cause at least a portion of the photographic image to appear to be a view from underwater; and
    transferring the distorted image to a substrate configured to be wrapped or applied to at least a portion of the physical article.

2. The method of claim 1, wherein obtaining the photographic image having the environmental characteristics which is found in an intended operating environment of the physical article further comprises:
    identifying a physical location for the physical article that is to be camouflaged; and
    obtaining the photographic image of a specific terrain at the physical location.

3. The method of claim 1, wherein the photographic image comprises a digital image.

4. The method of claim 1, wherein the physical article is an object selected from clothing, vehicles, aircraft, watercraft, structures, buildings, pipes and piping, equipment, weapons, hardware, and other items used for military or other purposes.

5. A method of applying an aquatic environment camouflage pattern to a physical article, the method comprising:
    obtaining a digital photographic image having environmental characteristics which is found in an intended operating environment of the physical article;
    distorting the digital photographic image using a fish-eye disruptive pattern to change an appearance of the digital photographic image at least a portion of the photographic image to appear to be a view from underwater; and
    transferring the distorted image to a substrate configured to be wrapped or applied to at least a portion of the physical article.

6. The method of claim 5, wherein obtaining the photographic image having the environmental characteristics which is found in an intended operating environment of the physical article further comprises:
    identifying a physical location for the physical article that is to be camouflaged; and
    obtaining the photographic image of a specific terrain at the physical location.

7. The method of claim 5, wherein the physical article is an object selected from clothing, vehicles, aircraft, watercraft, structures, buildings, pipes and piping, equipment, weapons, hardware, and other items used for military or other purposes.

* * * * *